G. W. CLAYVILLE & D. W. DAVIS.
WHEEL TIRE.
APPLICATION FILED SEPT. 16, 1913.
1,108,704.  Patented Aug. 25, 1914.
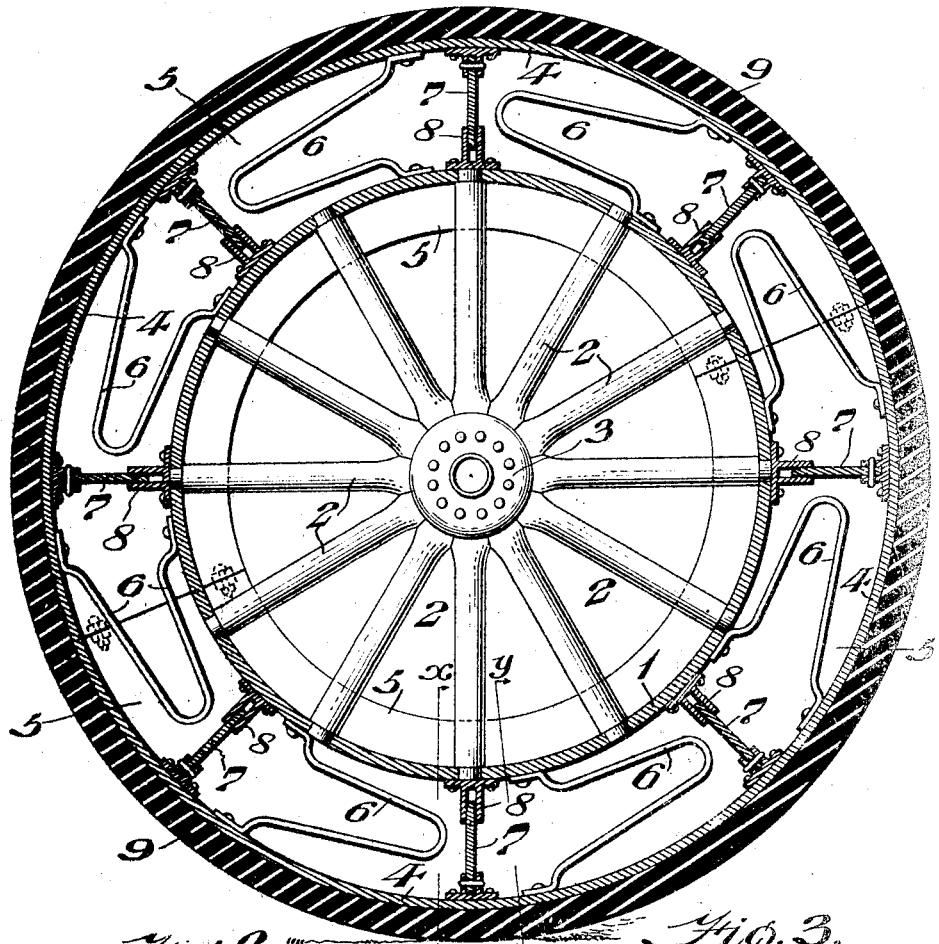
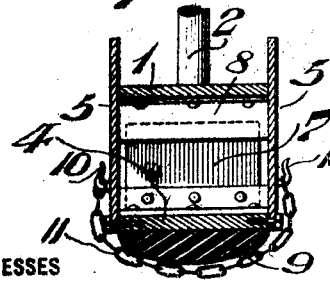
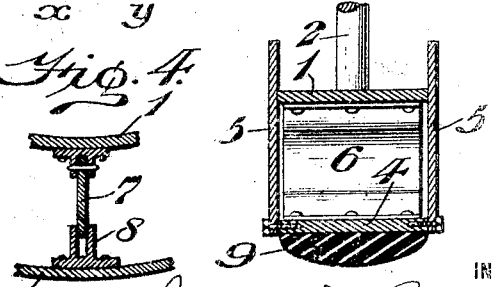

UNITED STATES PATENT OFFICE.

GEORGE W. CLAYVILLE AND DAVID W. DAVIS, OF PHILADELPHIA, PENNSYLVANIA, ASSIGNORS OF ONE-THIRD TO WALTER B. GRAY, OF PHILADELPHIA, PENNSYLVANIA.

WHEEL-TIRE.

1,108,704. Specification of Letters Patent. Patented Aug. 25, 1914.

Application filed September 16, 1913. Serial No. 790,000.

*To all whom it may concern:*

Be it known that we, GEORGE W. CLAYVILLE and DAVID W. DAVIS, citizens of the United States, residing in the city and county of Philadelphia, State of Pennsylvania, have invented a new and useful Wheel-Tire, of which the following is a specification.

Our invention consists of a tire which adapts a wheel to which it is applied to be nonpuncturable and of a highly resilient nature obviating inflation by pneumatic means.

It consists also of members adapted to stiffen and strengthen the connection of the tire proper with the felly and prevent severe creeping of said tire proper.

The invention is satisfactorily illustrated in the accompanying drawing, but the important instrumentalities thereof may be varied, and so it is to be understood that the invention is not limited to the specific arrangement and organization shown and described.

Figure 1 represents a vertical diametric section of a tire embodying our invention. Fig. 2 represents a transverse section on line x—x, Fig. 1. Fig. 3 represents a transverse section on line y—y, Fig. 1. Fig. 4 represents a section of a modification of a portion of the invention.

Similar numerals of reference indicate corresponding parts in the figures.

Referring to the drawings:—1 designates a felly, and 2 designates spokes that are connected with the same and with the hub 3 of a wheel in any suitable manner. 4 designates a circular rim comprising the tire proper surrounding the exterior of said felly 1 at a distance therefrom and has connected with it the side members 5 which are composed of circular plates as annuli which freely embrace the sides of the rim 4 and extend inwardly therefrom a sufficient distance as to be engaged with said rim under all conditions of the wheel and so be prevented from disconnection therefrom.

In the space between the rim 4 and felly 1, are the springs 6 which in the present case are comparatively U-shaped or semi-elliptical, one limb or leaf of each of said springs being rigidly connected with the felly, and the other limb with the rim, thus providing resiliency for the wheel; it being seen that when the wheel is in use the portion of the tread of the same below a spring, when it reaches the surface of the ground, roadway, street, etc., is caused to yield upwardly due to the load imposed on said portion. This yielding however is subjected to the resistance of the spring, which owing to its nature renders the rim and consequently the wheel resilient as is evident in a gentle but efficient manner, it being noticed that as the rim reaches its place of tread on the surface and passes the same, its side members 5 vibrate on the side edges of the felly and so preserve the position of the rim in its relation to the felly. To assist this to a further extent and prevent severe creeping of the rim, there are located between the rim and felly the resilient tongues 7 and sockets 8, which are connected respectively with the interior of the rim and exterior of the felly, it being noticed that each tongue has the end opposite to its place of connection with the rim freely entering or telescoping the socket and playing therein, it being adapted to abut against the base of the socket, said base being closed and so limiting or adjusting the extent of motion of the rim toward the felly without interfering with the proper resilient action of the springs, while, however, preventing injurious closing of the leaves thereof, one on the other, the tongues and sockets also serving to connect the rim with the felly in the circular direction of the wheel and likewise to brace said members at intervals and correspondingly stiffen the wheel while preserving its resiliency. It will be noticed that the greater portions of the tongues are outside of the sockets and thus the former have ample length to bend or give as the outer rim moves eccentrically with regard to the inner wheel structure, and then resume their right lined directions, their free ends playing in and out of the sockets as the outer rim moves, as above stated.

The periphery of the tire proper is shown as clad with the shoe 9 of rubber or other suitable material as well known and the extent of the side members 5 of the tire proper has thereon the hooks 10 for connection therewith of the chain 11 which is passed over the shoe for non-skidding purposes.

In Fig. 4, we illustrate the reversal of the positions of the tongues and socket, that is to say, the socket 8 is shown as connected with the inner periphery of the tire proper 4, and the tongue 7 is shown as connected with the outer periphery of the felly 1, but the tongue has its movable connection with and play in the socket, and the operation of said members is the same as in Figs. 1 and 2.

It will be noticed that the side members 5 of the tire proper 4 extend inwardly beyond the edges of the felly, so that during the vibrations of the tire proper, the joint formed by the felly and said side members is not uncovered at any time, and thus, dirt, dust, stones, etc., are prevented from entering the space between the tire proper and felly. The tire proper and its side members are made preferably in sections to facilitate the assembly of the various parts of the device, the same being connected by bolts or nuts, as shown in Fig. 1, or other suitable means.

Having thus described our invention, what we claim as new and desire to secure by Letters Patent, is:—

1. In a resilient and non-puncturable tire, a tire proper, a felly encircled thereby and separated therefrom, a substantially semi-elliptical spring interposed between said tire proper and felly and having its ends attached directly to said tire proper and felly at points in radial alinement, a socket secured to said felly, and a resilient tongue secured at one end to said tire proper and having its other end freely movable in said socket and adapted to abut against the base thereof.

2. In a wheel tire of the character stated, a tire proper, a felly, the former freely encircling the latter, semi-elliptical springs between said tire proper and felly and connected respectively with the same, sockets and resilient tongues fitted to each other telescopically between said tire proper and felly and connected respectively with the same, said tongues adapted to abut against the bases of the sockets, and plates which extend from the sides of said tire proper radially therefrom over the sides of said felly toward the hub of the wheel and being adapted to ride freely on said felly and to close the sides of the space between the felly and tire proper in which said resilient device and sockets and tongues are contained.

GEORGE W. CLAYVILLE.
DAVID W. DAVIS.

Witnesses:
JOHN A. WIEDERSHEIM,
H. W. LAFFERTY.